INVENTOR.
Verne L. Olson
BY
ATTORNEY.

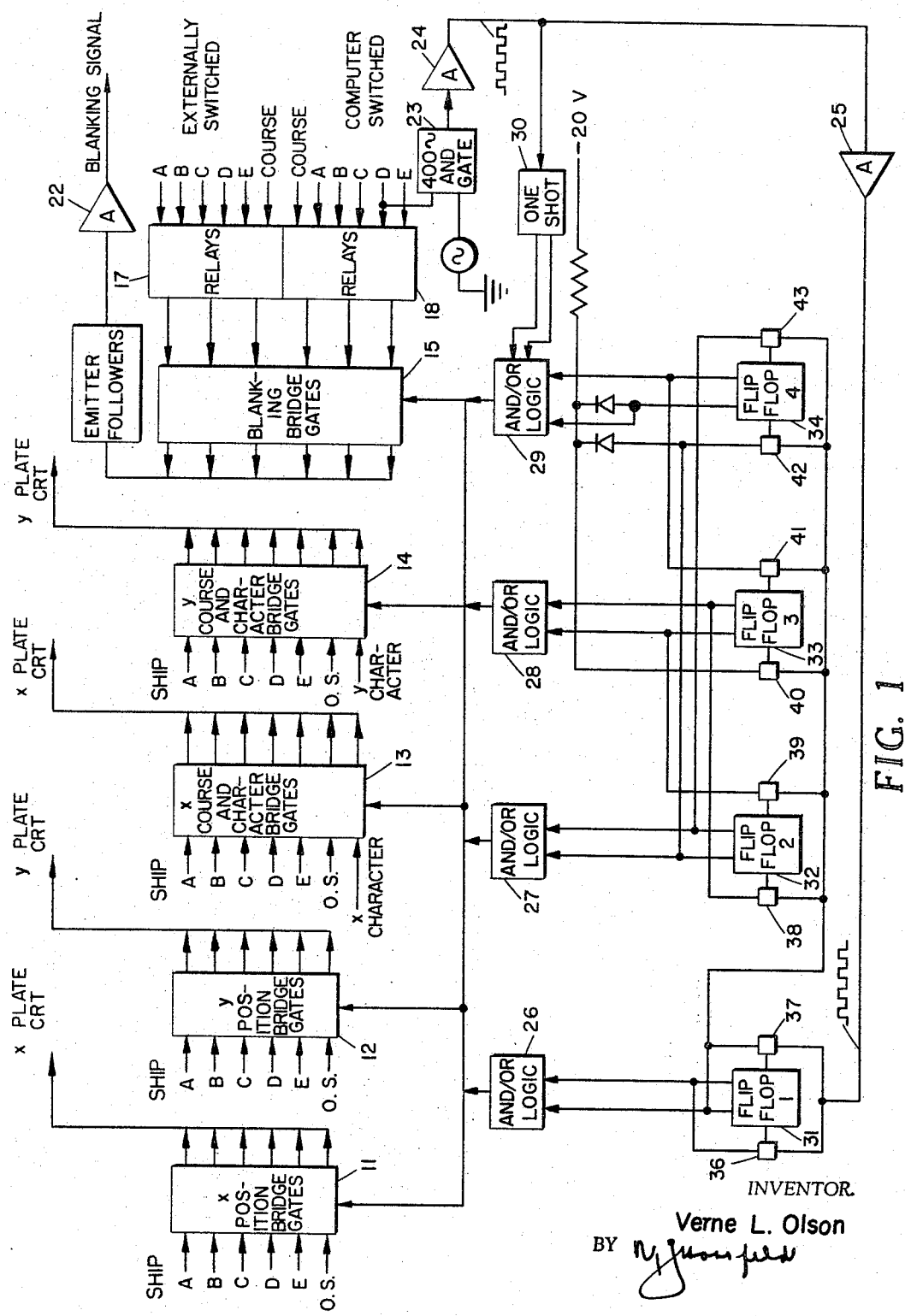

United States Patent Office 3,333,260
Patented July 25, 1967

3,333,260
ELECTRONIC COMMUTATOR
Verne L. Olson, Van Nuys, Calif., assignor, by mesne assignments, to the United States of America as represented by the Secretary of the Navy
Filed May 28, 1964, Ser. No. 371,161
10 Claims. (Cl. 340—324)

ABSTRACT OF THE DISCLOSURE

An electronic commutator for sequentially displaying on a cathode ray display tube computer information corresponding to the position, course and character of each of a plurality of ships. It is essentially comprised of logic circuitry made up of AND and OR gates controlled by flip-flop circuits which control the operation of the gates at predetermined intervals. Time sharing of the computer data is used for continuously displaying several ship positions with their identifying data.

---

The present invention relates generally to electrical apparatus for sequentially selecting information from a number of input signal sources for transmission to a display means. More specifically, the invention is directed to electronic switching and gating means especially adapted to commutate to a display tube a number of input signals of any wave form representing the position, course and character of a plurality of targets.

In the past various types of driving mechanisms have been employed as a commutator for coupling a plurality of transducer inputs to a display apparatus, cathode ray tube (CRT) or the like for selectively switching input signals appearing at the inputs to the display apparatus. For example, one method has been to connect a plurality of stator plates to a plurality of transducer inputs and then cause a rotor to be rotated successively past each of the stator plates using a motor to drive the rotor. When a display device such as a CRT is connected to the rotor, successive input signals may be displayed thereon.

Electrical commutators have been used to perform various types of commutation functions in the telemetering art. These types of commutators have for the most part been unable to handle a substantial amount of information in the limited time required to scan the position, course and character of a plurality of targets with respect to the searching vessel.

An object of the present invention is to provide an electronic commutator especially adapted for commutating a maximum amount of information to a cathode ray display tube or the like in a minimum period of time and which may be constructed using well known gating and switching circuitry.

Another object is to provide a novel electronic commutator for transferring selected information to the X and Y deflection plates of a cathode ray tube to indicate the location, course and character of various ships within a selected area with respect to the searching vessel or own ship hereinafter referred to as OS.

Other objects and features of the invention will hereinafter become more fully apparent from the following description of the annexed drawings.

FIG. 1 is a functional block diagram of the electronic commutator of the present invention;

Briefly described, the electronic commutator functions to select information in a sequential manner by commutating a plurality of input signals applied to the inputs of a plurality of diode bridge gates to a display device. The electronic apparatus contains three basic components; flip-flops, logic, and input signal bridge gates. The flip-flops and logic form the time sequence in which the bridge gates are opened and closed. When the bridge gates are opened they appear as a short circuit and provide electrical continuity between the input to the gates and the display device; when a signal gate is closed, it appears as an open circuit. Thus, the signal gate is analogous to a mechanical switch.

Since the time sequence formed by the flip-flops and logic is serial and connected to certain groups of signal gates in serial fashion, the device acts as a mechanical commutator. The sequence in which the various signal gates are opened and closed and the time that the signal gates stay opened and closed can be varied with a rearrangement of the flip-flops and logic. The cycle time of the events being sampled may be varied by varying the clock rate.

The position, course, character and blanking signals applied to the individual diode bridge gates originate in a computer which forms no part of the present invention, and these signals contain information regarding the position of the searching vessel (OS), the targets surrounding the searching vessel within a selected area, the course of each target and the letter character of each target. Switching and amplifying means are provided to commutate externally generated blanking signals to the grid of the display tube to blank out the nonessential portions of these signals.

Five target positions can be shown on a CRT at one time and relays coupled to the bridge gates which pass the blanking signals to the CRT grid enable the showing of one target at a time or any combination of targets.

Figure 1A:
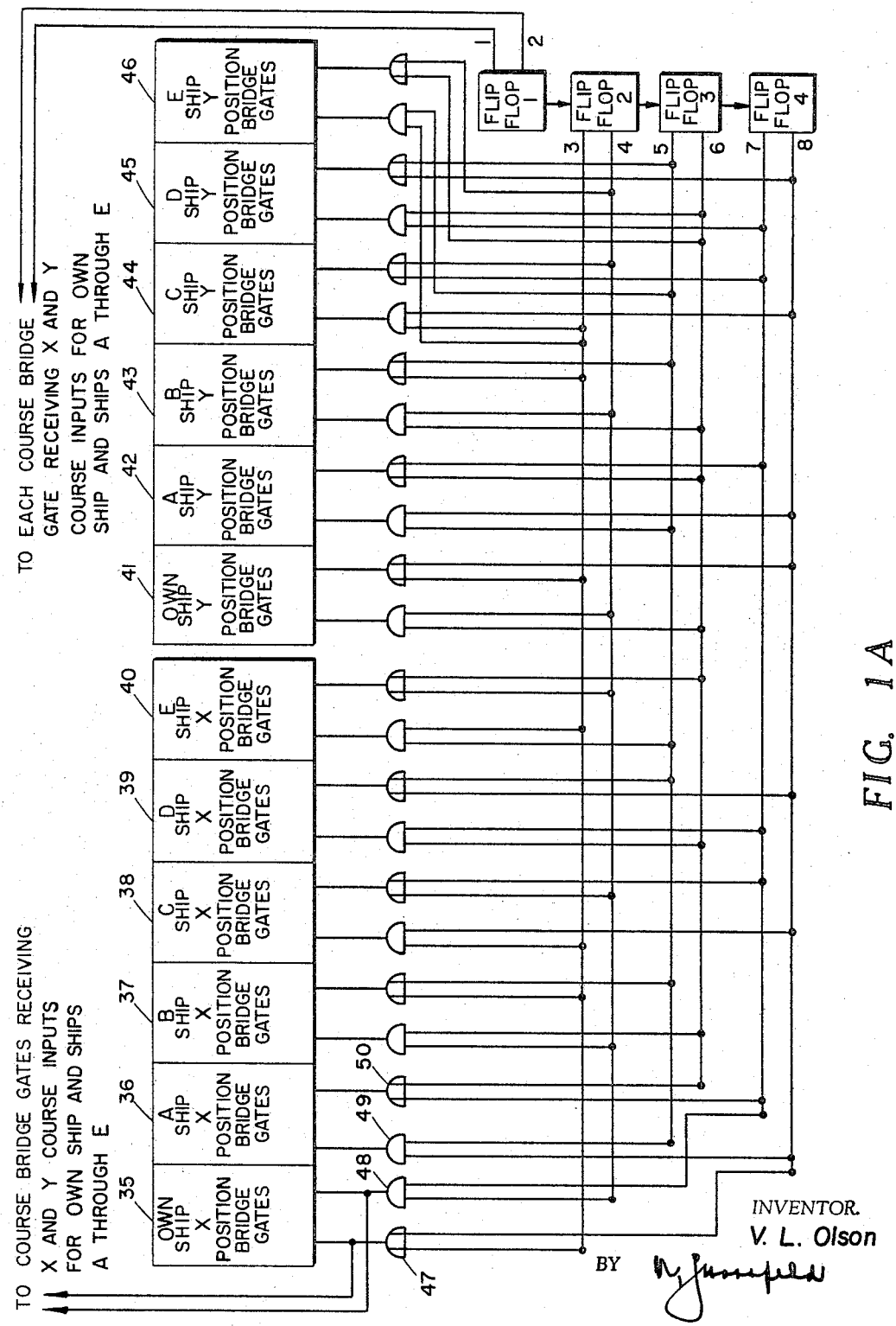
FIG. 1a illustrates the AND/OR logic circuitry interconnecting the flip-flop outputs with the X and Y position bridge gates of FIG. 1.
Figure 6:
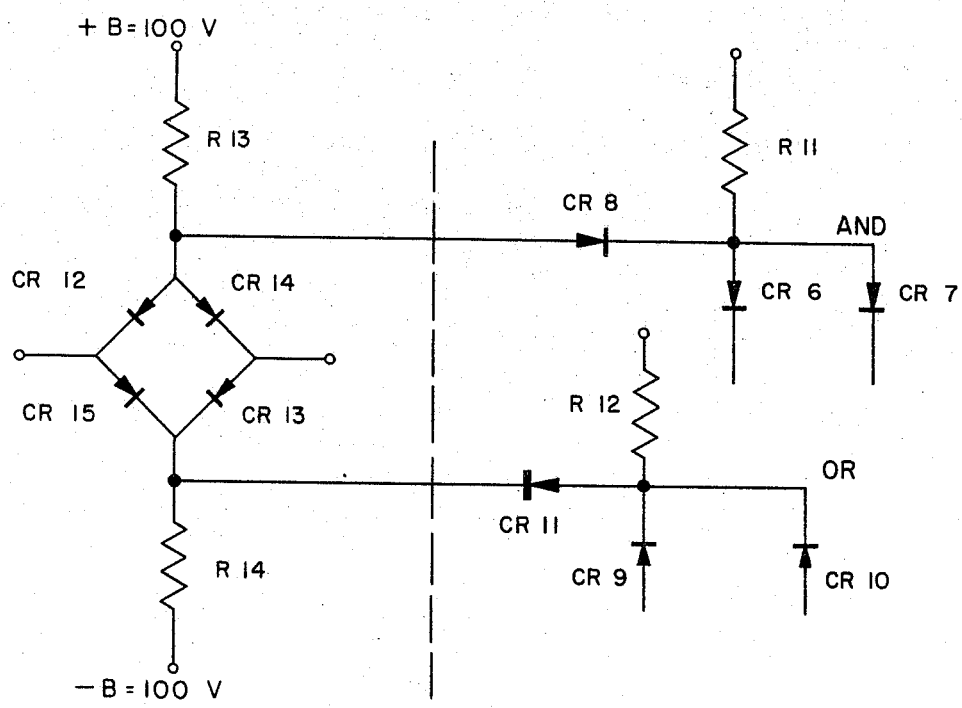
FIG. 6 illustrates the individual AND/OR gates of FIG. 1.

Referring more in detail to the drawings and particularly to FIGS. 1, 1a and 6, it is seen that four groups of bridge gates 11 through 14 are connected to receive information on the position, course and character of the five ships, A through E, and OS. Each signal representative of the X and Y directional coordinates of position and course of the ships are applied to the input of the diode bridge gates 11, 12, 13 and 14, respectively and allowed to pass to the X and Y deflection plates of a CRT when an enabling voltage is applied to the bridge gates via the AND/OR gates (see FIG. 6). The function of these AND/OR gates will be described more completely in a later description of FIG. 6.

The signal representing the OS position is normally displayed at the center of the display scope and a D.C. level input indicating the target position will appear on the screen as a spot of light. A plus D.C. voltage on the X plate will place the spot above the OS position and the more positive the voltage, the higher the spot position on the screen will be. A minus D.C. voltage on the X plate tends to move the spot below the OS position. A plus D.C. voltage on the Y plate tends to move the spot to the right of the ship's own position and a minus D.C. voltage of the Y plate tends to move the spot to the left of own ship's position.

Figure 2:
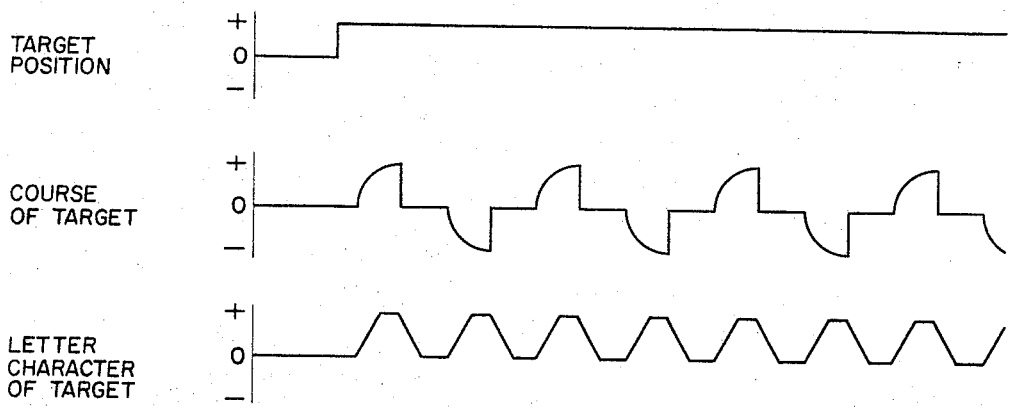
FIG. 2 is an illustration of the shapes of wave forms of signals applied to the inputs of the position, course and character bridge gates of FIG. 1.
Figure 3:
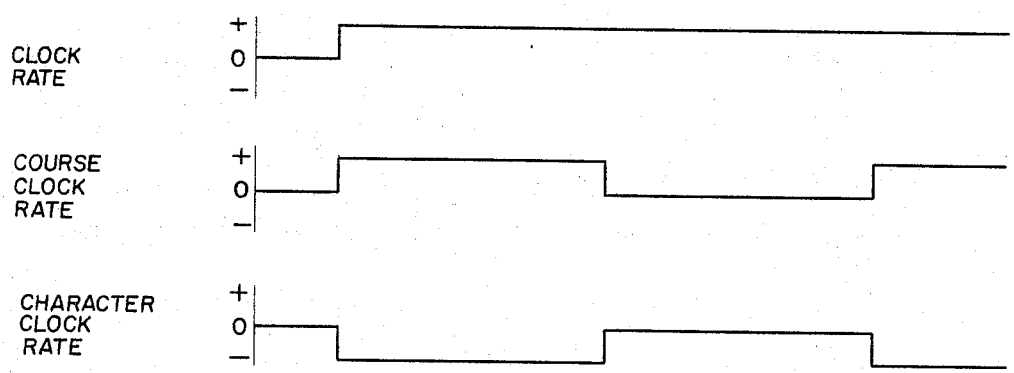
FIG. 3 is a wave form representation of the clocking signals applied to the AND/OR logic associated with each bridge gate in FIG. 1 for closing these gates in a predetermined sequence to enable the position, course and character information of a plurality of ships to be shown in rapid succession on a display tube.
Figure 3A:
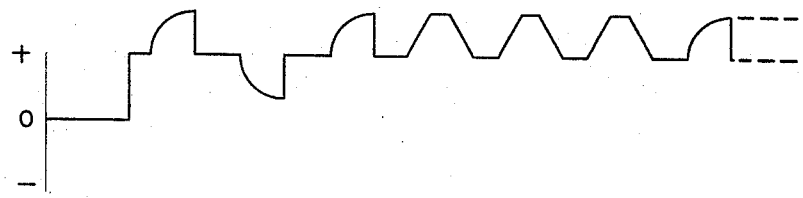
FIG. 3a is the signal which will appear on the X and Y deflection plates of the display tube.

The signals shown in FIG. 2 originate in a computer and represent the position, course and character of each of the five targets. The course and character signals of each target are superimposed on the D.C. levels representing the various target positions at clocked intervals as provided by the course and character clock rates of FIG. 3. A signal introduced on the D.C. level in the shape of a half sine wave (as shown in FIG. 2) will show the course of the target. Immediately following the half sine wave signal is the trapezoidal shaped signal identifying the character of each specific target. The letter character will of course vary from target to target.

These signals appear at a rate of 30 cycles per second or faster and the on/off change is not visible to the human eye. A clock rate is provided by the flip-flop circuits to allow the target's position, direction and letter character to appear simultaneously on the scope. The course information for each target (the half sine waves) would appear continuously for each of the ship courses as clocked if it were not for the blanking signals applied to the grid of the scope to blank out a part of the half sine wave and allow the letter character of the ship to appear. These signals are generated externally and coupled through relays 17 and 18 to one bridge gate in block 15. This will be more fully discussed with reference to FIG. 4.

After the position, course and character for ship A are displayed, a complete cycle starts again with a display of the course, position and letter character of another ship. After the positions of ships A through E and OS with the course and character signals superimposed thereon are all shown, the D.C. level shifts back to the first target position and the cyle is complete.

Each of the blocks 11 through 15 of FIG. 1 contains six diode bridges of the type shown in FIG. 6. Blocks 11 and 12 represent the groups of diode bridges receiving the X and Y coordinate information for the position of ships A through E and OS. Blocks 13 and 14 have their course bridge gates coupled respectively to the X and Y position bridge gates of blocks 11 and 12. Each of the diode bridge gates of FIGS. 1 and 1a are coupled to the outputs of the AND/OR gates so that the diode bridge gates will conduct signals from ships A through E (course, character and position) and then OS in succession. Since the outputs from each of the AND/OR gates in FIG. 1a additionally control diode bridge gates receiving the X and Y course and character inputs for the target ships, all information pertaining one slip would pass to the CRT display tube before information from another ship. As will be seen in FIG. 4 however it is necessary to blank out part of the course information. The exact nature of the switching of the diode bridge gates by the AND and OR gate outputs is discussed in detail later. However, for the purpose of understanding the sequence of target display, reference should be made to FIG. 4 which illustrates the display time for A through E and OS.

Figure 5:
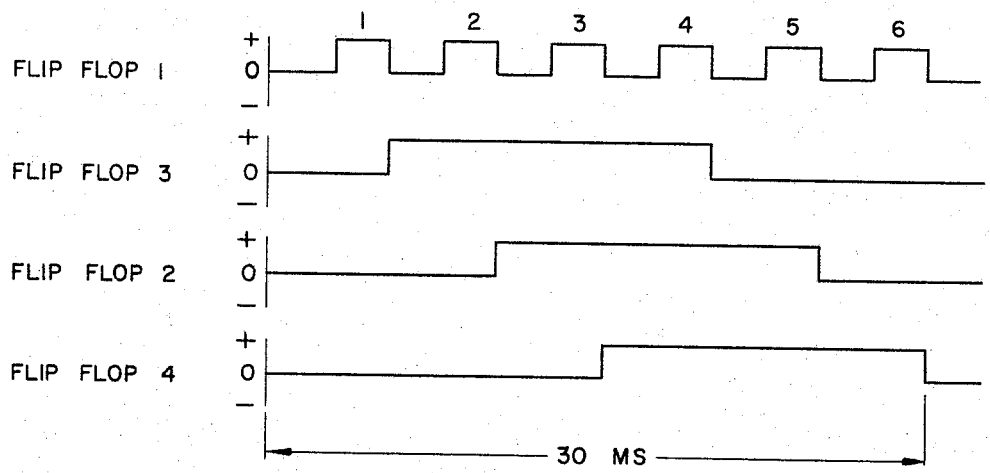
FIG. 5 shows the output signals from the individual flip-flops of FIG. 1 which are coupled to the individual AND/OR gates of FIG. 1a to provide the display sequence of FIG. 4.

Turning now to a more detailed description of the commutator components, and referring to FIG. 5, the timing sequence of pulses provided by the flip-flops 31, 32, 33 and 34 is shown. These pulses shown in FIG. 5 are applied to the diode bridge gates of FIG. 6 through the AND/OR logic. The first flip-flop 31 is driven by a pulse with a repetition rate of 2.5 cycles per millisecond from the output of amplifier 25 and produces an output pulse with a repetition rate of 5 cycles per millisecond. All of the flip-flops 31 through 34 produce an output of approximately ±10 volts. The first flip-flop 31 switches the other flip-flops 32, 33, and 34 so that over a given six pulses the trailing edge of the first positive pulse switches on the third flip-flop 33 and the second pulse in the pulse series switches on the second flip-flop 32. The third pulse in the pulse series switches on the fourth flip-flop 34 and the fourth pulse in the pulse series switches the third flip-flop 33 off. The fifth pulse in the pulse series switches the second flip-flop off and the sixth pulse switches the fourth flip-flop off.

The 30 millisecond pulse time of the second, third, and fourth flip-flops is also the complete commutation time when ship A is first displayed and the target ship sequence of display is A, B, C, D, E and then ship OS.

Figure 7:
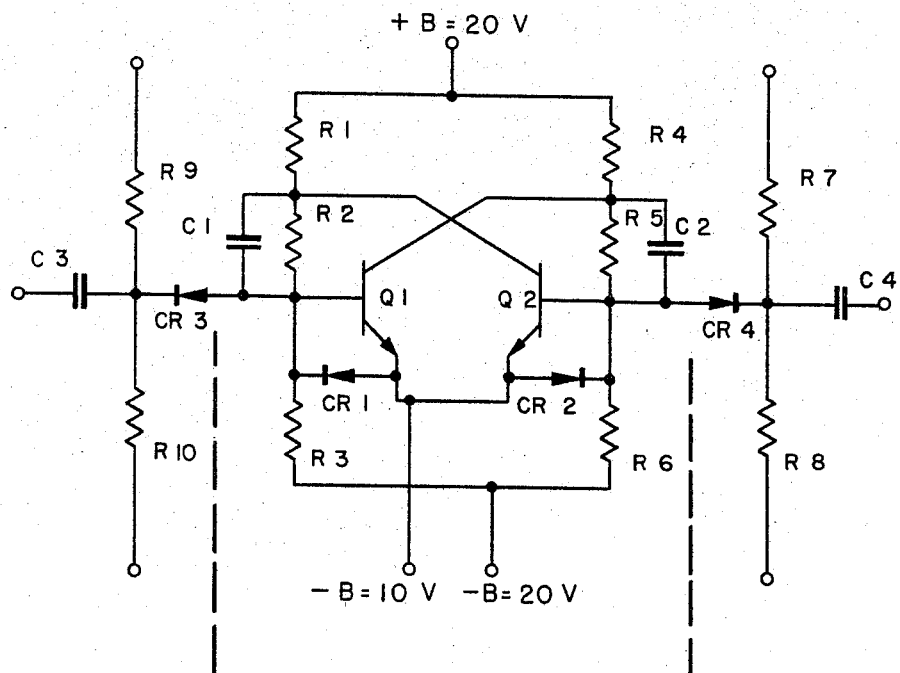
FIG. 7 illustrates a componential breakdown of the flip-flops and threshold gates of the block diagram of FIG. 1.

The Eccles-Jordan commutation flip-flops shown in FIG. 7 have an output voltage ±10 volts and this output voltage was selected as the proper switching voltage at the diode bridge gates shown in FIG. 6. The switching voltage at the diode bridge gates must exceed the input signal voltage to the bridge gates since there will be some diode voltage drops at the AND and OR gates. Resistors R2 and R5 in FIG. 7 limit the base currents of the transistors from the flip-flops to 1.5 milliamperes, R3 and R6 are current limiting resistors and they are used to provide the necessary reverse bias at the bases of transistors of Q1 and Q2. CR1 and CR2 prevent excessive back biasing voltage across the transistor base-emitter junction. Capacitors C1 and C2 along with resistors R2 and R5 serve as high pass filters and are necessary for use as low input impedances during the transistors switching period. R1 and R4 are limiting resistors for the collector current (approximately 14 milliamperes) and the collector resistor values are less on flip-flop 31 due to its capacitive loading.

Each of the flip-flops has two threshold gates and threshold gates 36 through 43 are used for switching the flip-flops at logical sequences to prevent any time race problem within the flip-flops. Components R9, R10, and C3 and CR3 make up one threshold gate and the input pulse to C3 and R9 comes from flip-flops whose voltage levels are ±10 volts. C3 along with R9 and R10 produces a differentiated pulse of approximately 20 volts. If transistor Q1 is biased on when the input to R9 is −10 volts and a negative going differentiated pulse is seen at the junction at R9 and R10, then CR3 becomes forward biased and switches Q1 on off, consequently changing the state of the flip-flop.

The purpose of the diode bridge gates shown in FIG. 6 and discussed generally with reference to FIGS. 1 and 1a is to pass or block the input signals from the computer. None of these signals representing the X and Y position, course, character and character blanking information exceeds ±5 volts. In order for the output voltage to follow the input diodes, diodes CR8 and CR11 must be reversed biased by applying at least +7 volts to the cathode CR8 and at least −7 volts to the anode of diode CR11. Diodes CR12, 13, 14 and 15 will then be forward biased. In order to block signals, diodes CR8 and CR11 must be forward biased by applying at least −7 volts to cathode CR8 and at least +7 volts to the anode of CR11. The bias voltages are applied sequentially from the flip-flops 31, 32, 33, and 34 to the AND and OR gates (FIG. 1a) so that ship A appears with its course and character before ship B appears with its course and character and so on.

The outputs of the diode bridge gates with the exception of the blanking gates are connected to the deflection plates of the CRT.

The outputs of the blanking gates are coupled to the grid of the CRT or display tube used and the resistors R13 and R14 in the diode bridge gates were selected for minimum loading of the flip-flop and proper impedance matching to the CRT.

The AND gates shown in FIGS. 1a and 6 comprise dode CR6, 7 and R11 while the OR gates comprise diodes CR9 and CR10 and R12.

Figure 6A:
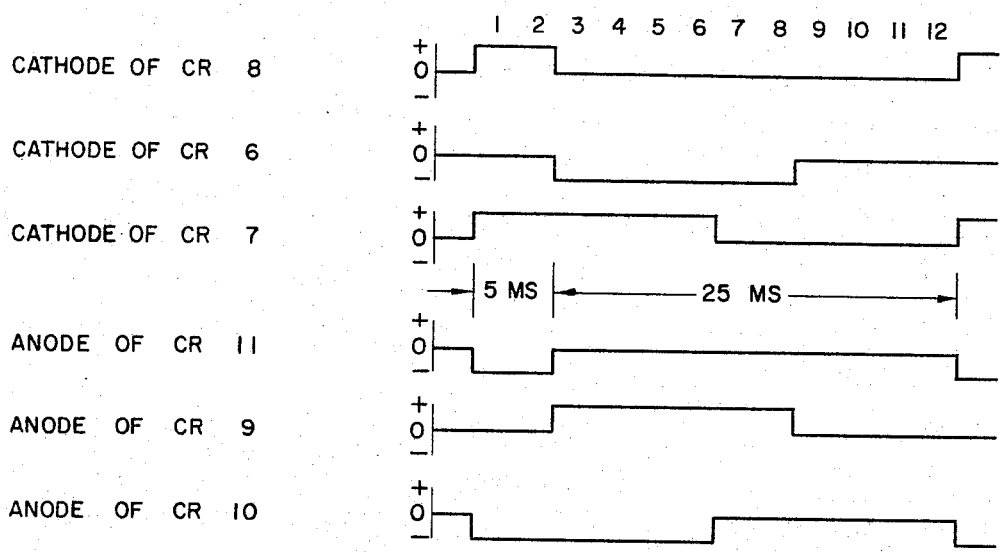
FIG. 6a shows the combinations of signals in FIG. 5 from the flip-flops necessary to gate on the AND/OR gates of FIG. 6.

The signals applied to the cathode of CR6 and CR7 produce an output pulse at the cathode of CR8 during times 1 and 2 in FIG. 6a when a positive pulse is applied to both cathodes of CR6 and CR7. A positive voltage is seen at the anode of CR11 of the OR gate when either of the anodes of diodes CR10 and CR11 receive a positive pulse. Therefore, as shown in FIG. 6a, the OR gate is closed for 25 milliseconds while the AND gate is closed for 5 milliseconds to provide a total conduction time for the diode bridge gate of 30 milliseconds. This 30 millisecond timing pulse to the diode bridge gates is the same timing pulse that enables the X and Y position information of ships A through E and OS to be displayed in sequence on the display scope in the timed sequence illustrated in FIG. 4.

Figure 4:
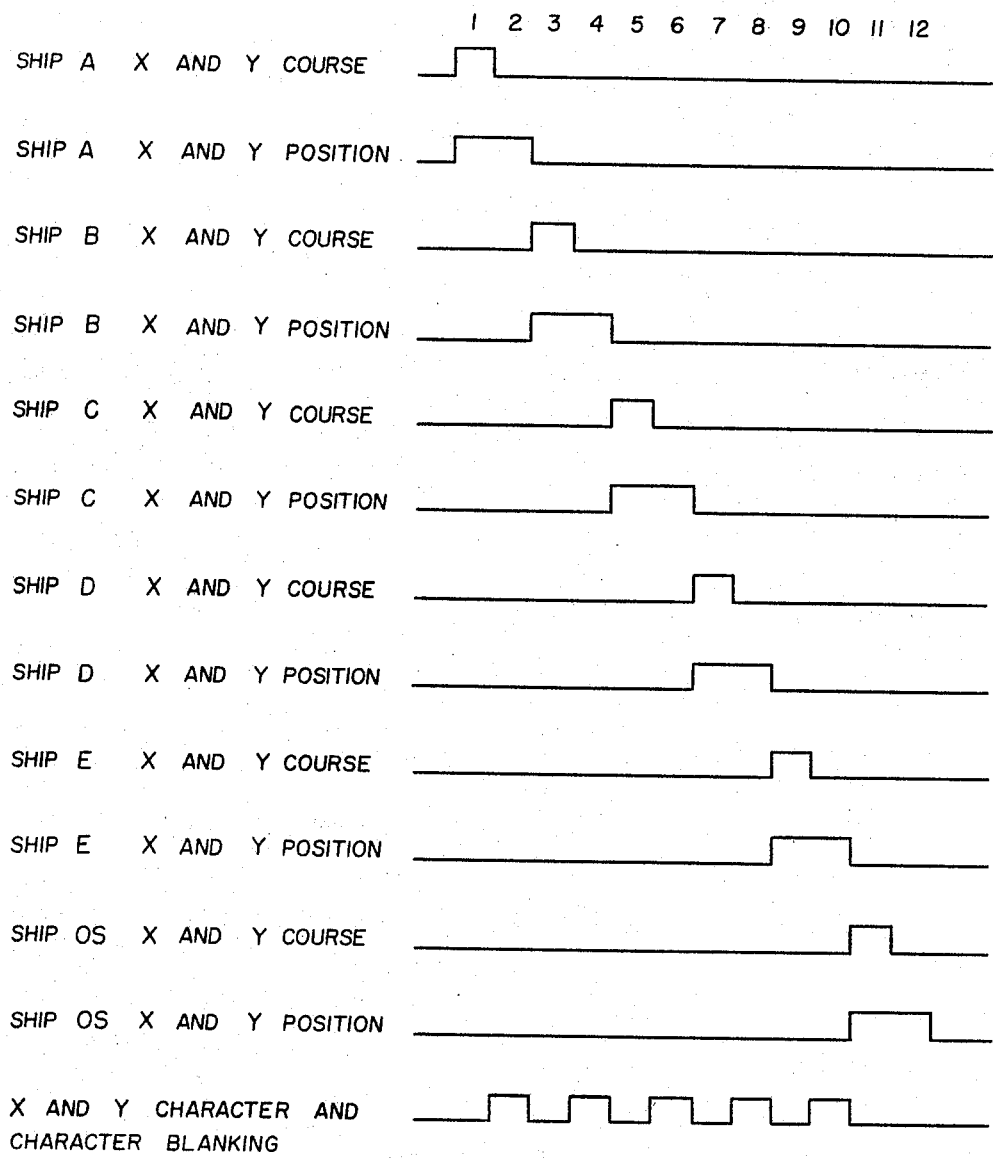
FIG. 4 illustrates the sequence in which each of the ships A through OS are displayed by application of the clocking signals shown in FIG. 3, to the bridge gates 11–15 of FIG. 1 in a predetermined sequence.

During time 1 of FIG. 4 signals from AND and OR gates 49 and 50 turn on X and Y position bridge gates 36 and 42 to allow information of the course and position of ship A to pass to the X and Y deflection plates of the CRT display scope. However due to the externally applied course blanking signals applied during times 2, 4, 6 etc. and the A–E character blanking signals applied during times 3, 5, 7, etc. as shown in FIG. 4, X and Y course and character information respectively for the targets during these times are blanked out on the display scope. These blanking signals originate in the computer with the course blanking signals for all ships being applied to one of six bridge gates in 15 and character blanking signals applied to the other five. The outputs of all of the bridge gates are applied to the grid of the CRT through emitter-follower 21 and output amplifier 22. FIG. 1a only shows a portion of the functional block diagram of FIG. 1 for purposes of describing the sequential switching operation of the bridge gates. However the remaining bridge gates in 13–15 are switched in a similar manner, and it is deemed to be within the skill of the art to vary the connections from flip-flop outputs to the AND/OR gates for varying the display timing sequence.

Blanking signals are used for biasing off the CRT display tube at the desired time and zero volts is needed at the grid of the CRT for blanking. For unblanking, plus 20 volts is used. Course blanking is needed for producing a character signal and is used from the time after the character has been traced until the electron beam starts to trace out the next ship's course.

There are two banks of blanking relays 17 and 18, one of which may be actuated by an operator and used to select the target or targets which will specifically appear on the display scope and one of which (18) is operated by the computer and is also needed to perform the blanking operations. Blanking circuits are used to blank the undesired signals before they reach the scope. These are the targets not desired by relay selection and also the beam travel time from target to target. The target to target blanking is performed by clocking signals originating externally in a computer.

A 400 cycle AND gate is connected to the D input blanking signal from the computer and a 400 cycle signal source and the AND gate 23 has its output coupled to amplifier 24 which in turn triggers one shot multivibrator 30 and provides the initial switching for flip-flop 31. This initial switching starts the timing count to the bridge gates. The 400 cycle signal is anded to the signal of the computer-switched D blank signal to provide the clock output to AND/OR logic 29, and the D blank input was chosen because it is in correct phase with 400 cycle input to the AND gate 23. The two outputs of one shot 30 are connected to OR and AND gates in 29 respectively to time the application of blanking signals from the computer to the CRT. This now synchronizes a commutated clock at 400 cycles and places it in phase with the inputs.

The outputs from the AND and OR gates forming the AND/OR logic 29 is sufficient to enable the blanking bridge gates 15 to conduct only over a portion of the cycle of switching signals applied thereto from the flip-flops 2, 3 and 4 (see FIG. 5). With regard to the specific switching signals applied to AND/OR logic 29 apart from the synchronizing control pulse applied via one shot multivibrator 30, it should be understood that FIG. 1 is merely a general functional representation of the flip-flop control of the AND/OR logic gates and is not intended to represent specific input connections to the AND and OR gates.

Such a specific representation is shown in FIG. 1a for the position bridge gates and it is considered within the skill of the art to provide the AND and OR gates associated with the diode bridge blanking gates with properly timed switching signals to enable blanking of the nonessential signal portions as shown in FIG. 4.

To blank out one of the ship's course vectors the course blank diode bridge gate has to block its input signal during the course time. When the input signal to the course blank bridge gate in 15 is blocked, zero volts will appear on the grid of the CRT and the course will cease to appear.

It should be noted here that each of the relay blocks 7 and 18 of FIG. 1 may be comprised of any type of relay switches which, when energized, enable a blanking voltage to reach the blanking bridge gates. The relays when closed enable characters A through E to appear on the CRT since it is zero volts at the CRT grid which causes character signals to be blanked out. Thus as many of the externally switched relays as are energized determine the appearance of the course and character of A through E on the display scope. As long as the relays in block 18 are energized, signals will pass through the relay contacts to the character diode bridge gates and the characters will appear on the CRT. When the relays are de-energized, the blanking voltage will appear at the character bridge gates. The result would be a blanking voltage of zero volts during the character time (back-biasing the CRT) and the characters will cease to appear.

The foregoing embodiments are merely illustrative and are not intended to limit the invention in any manner other than that recited in the appended claims.

What is claimed is:

1. A switching system for selectively commutating information from a number of signal sources to a display scope comprising:

(a) a first plurality of diode bridge gates connected to receive at one input thereof position information of a plurality of ships, (b) a second plurality of diode bridge gates connected to receive at one input thereof information representative of the course and character of said plurality of ships, (c) a third plurality of diode bridge gates for receiving blanking signals used to blank out the nonessential portions of said course and character information, (d) means connecting the outputs of said first and second plurality of diode bridge gates to the horizontal and vertical deflection plates of a display scope for applying thereto horizontal and vertical components of position, course and character information for said ships, (e) means connecting the outputs of said third plurality of diode bridge gates to the grid of said display scope for blanking the nonessential portions of said course and character information applied to said scope and, (f) means for sequentially switching between respective diode bridge gates of said first, second, and third plurality of gates which correspond to respective ships for applying the position, course and character information and blanking signals for each ship respectively to said scope.

2. The system of claim 1 wherein means for sequentially switching includes
   (a) a chain of bistable switching circuits connected together to provide gating signals at the outputs of each circuit,
   (b) first gate means interconnecting one output of each bistable switching circuit and a first input of a first predetermined number of said first, second and third plurality of diode bridge gates,
   (c) second gate means interconnecting the other output of each bistable switching circuit and a second input of a second predetermined number of said first, second and third plurality of diode bridge gates,
   (d) said first and second gate means enabling conduction from input to output in said diode bridge gates coupled thereto when signals from said bistable switching circuits are applied to said first and second gate means in a predetermined sequence.

3. The system of claim 2 wherein
   (a) said first gate means is an AND gate and said second gate means is an OR gate.

4. The system of claim 3 which further includes
   (a) relay means connected to an external source of course and character blanking signals and to said third plurality of diode bridge gates for applying said blanking signals to said gates,
   (b) a sync gate having one input connected to an external A.C. switching source and another input connected to an external source of blanking signals, said sync gate having its output connected to the input of said chain of bistable switching circuits whereby the outputs of said switching circuits switch said first, second and third plurality diode bridge gates for conveying position, course and character information to said display scope in a predetermined timed relation to the blanking signals applied to the grid of said scope.

5. The system of claim 4 wherein said bistable switching circuits in said chain comprise
   (a) a first flip-flop connected to said sync gate for driving the remainder of said chain, said remainder comprising,
   (b) a plurality of flip-flops each having a separate and distinct time period in which it remains in a given state,
   (c) said first flip-flop having its outputs connected to the diode bridge gates receiving horizontal and vertical course information for said target ships and searching vessel and said remaining flip-flops being connected to said course, character and position bridge gates.

6. A system for selectively commutating information to a display scope from a number of signal sources ranging from 1 through $n$ where $n$ is an integer comprising
   (a) a first plurality of diode bridge gates connecting sources of signals representing the X component of the position of $n$ ships to the horizontal deflection plates of said display scope,
   (b) a second plurality of diode bridge gates having their inputs connected to sources of signals representing the Y component of the position of $n$ ships and their outputs connected to the vertical deflection plate of said display scope,
   (c) a third plurality of diode bridge gates connecting sources of signals representing the X component of course and character of $n$ ships to the horizontal deflection plate of said display scope
   (d) a fourth plurality of diode bridge gates connecting sources of signals representing the Y component of course and character of $n$ ships to the vertical deflection plate of said display scope,
   (e) a fifth plurality of diode bridge gates interconnecting blanking signals for $n$ ships and the grid of said display scope
   (f) a chain of bi-stable switching elements interconnecting to provide each element with an output signal having a separate and distinct switching time,
   (g) logic gates each having input terminals connected to the outputs of separate bistable switching elements, the outputs of said logic gates connected to predetermined ones of said diode bridge gates in said first through fifth plurality of diode bridge gates for selectively enabling said diode bridge gates to commutate the position, course, character and character blanking signals respectively of ships 1 through $n$ respectively to said display scope.

7. The system of claim 6 wherein said logic gates include
   (a) first gate means interconnecting one output of each bistable switching circuit and a first input of a first predetermined number of said diode bridge gates,
   (b) second gate means interconnecting the other output of each bistable switching circuit and a second input of a second predetermined number of said diode bridge gates,
   (c) said first and second gate means enabling conduction from input to output in said diode bridge gates coupled thereto when signals from said bistable switching circuits are applied to said first and second gate means in a predetermined sequence.

8. The system of claim 7 wherein
   (a) said first gate means is an AND gate and where
   (b) said second gate means is an OR gate.

9. The system of claim 8 which further includes
   (a) relay means connected to an external source of course and character blanking signals and to said fifth plurality of diode bridge gates for applying blanking signals to said fifth plurality of gates,
   (b) a sync gate having one input connected to an external A.C. switching source and another input connected to an external source of blanking signals, said sync gate having its output connected to the input of said chain of bistable switching circuits whereby the outputs of said switching circuits drive said first and second gate means to enable conduction in said first through fifth plurality of diode bridge gates to commutate respectively the position, course and character information of each of ships 1 through $n$ respectively to said display scope.

10. The system of claim 9 wherein said bistable switching circuits in said chain comprise
    (a) a first flip-flop circuit connected to said sync gate for driving the remainder of said chain, said remainder comprising,
    (b) a plurality of flip-flops, each having the separate and distinct time period in which it remains in a given state
    (c) said first flip-flop having its outputs connected to diode bridge gates receiving horizontal and vertical course information for ships 1 through $n$ and said remaining flip-flops being connected to said diode bridge gates receiving course, character and position information for ships 1 through $n$
    (d) said sync gate being an AND and
    (e) said A.C. switching source and said external source of blanking signals connected to said sync gate having the same frequency.

References Cited
UNITED STATES PATENTS

| | | | |
|---|---|---|---|
| 3,090,041 | 5/1963 | Dell | 340—324.1 |
| 3,123,824 | 3/1964 | Sherertz | 343—5 |
| 3,248,725 | 4/1966 | Low et al. | 340—324.1 |

NEIL C. READ, *Primary Examiner.*

A. J. KASPER, *Assistant Examiner.*